FILTER CIRCUIT

Filed March 2, 1967

INVENTOR
HERBERT L. METTE
BY: Harry M. Saragovitz,
Edward J. Kelly,
Herbert Berl &
Julian C. Keppler ATTORNEYS.

United States Patent Office 3,435,259
Patented Mar. 25, 1969

3,435,259
FILTER CIRCUIT

Herbert L. Mette, Neptune, N.J., assignor to the United States of America as represented by the Secretary of the Army Filed May 13, 1965, Ser. No. 455,660
Int. Cl. H01e *15/00;* H03c *1/48;* H03j *3/16*
U.S. Cl. 307—309 7 Claims

ABSTRACT OF THE DISCLOSURE

This invention relates to filter circuits using magneto-electric rectifying elements which are ohmic above a certain frequency and rectifying at lower frequencies. A typical magneto-electric rectifying element may comprise a slab of semiconductor material prepared with a pair of ohmic contacts at the ends and having one major surface roughened to allow a high surface recombination velocity of carriers traversing the material and the opposite major surface etched smooth to provide a low surface recombination velocity. If a potential is applied to the ohmic contacts of the element during application of a magnetic field parallel to the major surfaces, the carriers are deflected either to the high recombination velocity surface or to the low recombination velocity surface, depending upon the direction of the applied magnetic field. At frequencies below the transition frequency, current is substantially blocked in the magneto-electric rectifier during each half cycle of the input voltage, since most of the carriers are deflected by the magnetic field to the high recombination velocity surface of said magneto-electric rectifier during that half cycle. For higher frequencies, the magneto-electric rectifier is ohmic and the current can pass without restriction. In one embodiment, two magneto-resistor elements are connected in reverse rectification direction in series with a load and an alternating current source, to provide a high pass filter. In another embodiment, a low pass filter is obtained by connecting a magneto-electric rectifier in each of two arms of a bridge circuit.

The invention described herein may be manufactured and used by or for the Government for governmental purposes, without the payment of any royalty thereon.

This invention relates to electrical filters, and more particularly, to electrical filter circuits comprising magneto-electric rectifying elements which are ohmic above a certain frequency and rectifying at lower frequencies.

It is known that certain semiconductors, such as germanium, act as diode rectifiers when subjected to a magnetic field. A typical magneto-electric rectifying element may comprise a slab of semiconductive material prepared with a pair of ohmic contacts at the ends and having one major surface roughened to allow a high surface recombination velocity of carriers traversing the material and the opposite major surface etched smooth to provide a low surface recombination velocity. If a potential is applied to the ohmic contacts in the absence of a magnetic field, the magneto-electric rectifier element or slab exhibits ohmic characteristics, that is, the element acts like an ordinary resistor. If a potential is applied to the ohmic contacts of the element during application of a magnetic field parallel to the major surfaces, the carriers (holes and electrons) are deflected either to the high recombination velocity surface of this element or to the low recombination velocity surface of the element, depending upon the direction of the applied magnetic field. If the magnetic field is applied in a direction such that both carriers are deflected to the low recombination velocity surface of the element, a substantial portion of the carriers traverse the length of the element and the current in the element is comparatively large. The element then has a comparatively low resistance, corresponding to a forwardly biased diode rectifier. If the magnetic field is in the opposite direction, so that the carriers are caused to be deflected to the high recombination velocity surface of the element, the carriers recombine faster than if deflected to the low recombination velocity surface, their lifetime is shorter and the number of equilibrium carriers in the element is reduced considerably. The resistance of the element now is increased and the element becomes equivalent to a reversely biased diode rectifier. The phenomenon just described may be referred to as magneto-electric rectification.

A transition from the rectifying condition to the ohmic condition during application of a magnetic field has been found to occur as the frequency increases beyond a certain transition frequency. At this transition frequency, which is dependent, in part, upon the thickness of the element, the carriers which, at lower frequencies, would be deflected to the low recombination velocity surface of the element, are unable to reach either the low or the high recombination velocity surfaces of the sample during a given cycle of input voltage, and the alternating current characteristic of the element becomes completely ohmic. The thicker the element, the lower will be the threshold frequency and vice versa. Furthermore, the threshold frequency is directly proportional to the carrier mobility of the material and the strength of the magnetic field. This property of magneto-electric rectifiers is used in the invention to provide low pass and high pass filter circuits.

In one embodiment of the invention, a high pass filter is obtained by connecting two magneto-electric rectifiers in opposite rectification direction in series with the load circuit and input voltage source. At low frequencies, that is, at frequencies below the transition frequency, current is substantially blocked in one of the magneto-electric rectifiers during each half cycle of the input voltage, since most of the carriers are deflected by the magnetic field to the high recombination velocity surface of said one magneto-electric rectifier during that half cycle. During the next half cycle of the input voltage, most of the carriers are deflected to the high recombination velocity surface of the other magneto-electric rectifier, thereby blocking current flow in the latter rectifier during this next half cycle. For low frequencies therefore, the current is blocked alternately by one of the two magneto-electric rectifiers so that no voltage appears at the load. For higher frequencies, that is, for frequencies above the transition frequency, both magneto-electric rectifiers are ohmic and the current can pass without restriction, thereby providing an output voltage at the load.

In another embodiment of the invention, a low pass filter is obtained by connecting a magneto-electric rectifier having the aforesaid properties in opposite rectification directions in two arms of a bridge circuit. The other two arms of the bridge contain conventional resistors. The input voltage source is connected across one diagonal of the bridge and the output load is connected across one diagonal of the bridge and the output load is connected across the other diagonal. At higher frequencies, that is, at frequencies above the transition frequency of the magneto-electric rectifiers, the magneto-electric rectifiers are ohmic and, if the resistors and the magneto-electric rectifying elements are properly chosen, the bridge will be balanced and no voltage will appear across the load resistor. At frequencies below the threshold frequency, however, the magneto-electric rectifier elements assume their normal magneto-electric rectifying properties during alternate half cycles of the input voltage. Since the two magneto-electric rectifier elements in the bridge differ greatly in resistance (by the rectification ratio) the bridge becomes unbalanced sufficiently for a voltage to appear across the output load.

Normally, passive filters contain either a capacitor or an inductance, or both in addition to ohmic resistors. In either case, there occurs a phase shift between the incoming and outcoming signal. It is possible, as a rule, to correct for this phase shift by proper circuitry, but only for one given frequency. The present invention contains only ohmic circuit elements and no appreciable phase shift occurs over a wide frequency spectrum, which may extend, for example, up to 1K mc.

Other objects and advantages of this invention will become apparent from examination of the specification, taken together with the drawing wherein.

Figures 1, 2, 3:
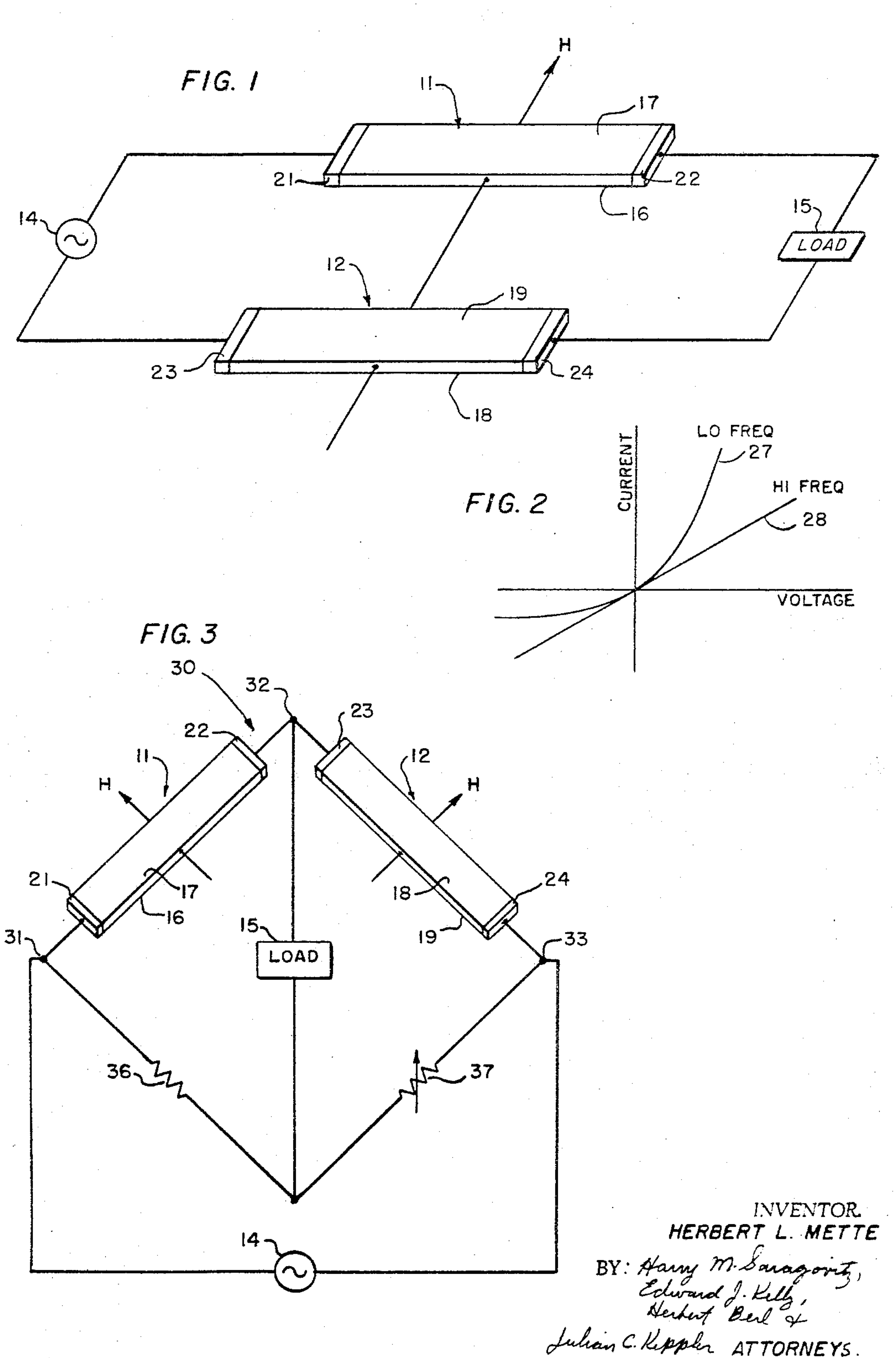
FIG. 1 is a circuit diagram of an embodiment of a high pass filter according to the invention.
FIG. 2 is a plot of the current-voltage characteristic of the magneto-electric rectifiers used in the circuits of FIGS. 1 and 3.
FIG. 3 is a diagram of a low pass filter according to the invention.

Referring to the drawing, FIGURE 1 discloses a high pass filter circuit 10 including a pair of magneto-electric rectifiers 11 and 12 connected in a series circuit with a source 14 of alternating current energy and a load 15. Each of the magneto-electric rectifiers 11 and 12 comprise a more or less rectangular slab of a semiconductor material, such as germanium, having two spaced major surfaces of high and low surface recombination velocity, respectively, and ohmic contacts or electrodes at the two end faces.

As illustrated in FIGURE 1, magneto-electric rectifier 11 has a low recombination velocity surface 16 and a high recombination velocity surface 17, while magneto-electric rectifier 12 has a low recombination velocity surface 18 and a high recombination velocity surface 19. Each of these surfaces are referred to also as major surfaces; the major surfaces of a given magneto-electric rectifier are substantially parallel to one another. The high recombination velocity surface of each magneto-electric rectifier may be produced by roughening the surface, while the low combination surface of that magneto-electric rectifier may be produced by etching the surface. Such techniques for attaining high and low recombination velocity surfaces are well known in the art. Ohmic contacts or electrodes 21 and 22 are provided at opposite end faces of magneto-electric rectifier 11, while electrodes 23 and 24 are secured to the two end faces of magneto-electric rectifier 12.

The length of the semiconductor slab is large compared with the thickness, so that the ratio of forward to reverse resistance owing to difference in surface recombination velocities of the two major surfaces of a given magneto-electric rectifier is not overcome or diminished substantially by diffusion, in the case of large slab thickness, or by failure to achieve diversion of the carriers to the appropriate surface, in the case of small slab length. For a given material, the thickness of the slab controls the threshold frequency above which the characteristic of the magneto-electric rectifier ceases to be rectifying and becomes at all times ohmic. In the absence of a magnetic field, current will flow between electrodes 21 and 22 of magneto-electric rectifier 11 when the undirectional potential is applied to electrodes 21 and 22 such that electrode 21 is positive relative to electrode 22; similarly, current will flow between electrodes 23 and 24 of magneto-electric rectifier 12 when said potential is applied in the same fashion to electrodes 23 and 24.

A magnetic field, represented by an arrow with the reference character H, is directed parallel to the major surfaces of each of the magneto-electric rectifiers 11 and 12. In the arrangement shown in FIGURE 1, both magneto-electric rectifiers are exposed to a common magnetic field. Each magneto-electric rectifier may be exposed to a separate magnetic field, however, depending on the physical arrangement of the magneto-electric rectifiers.

Referring principally to FIGURE 2 the current-voltage characteristic of magneto-electric rectifier elements, such as the elements 11 and 12 of FIGURE 1, is shown as a function of frequency range. For applied voltages of lower frequencies, as represented by curve 27, each magneto-electric rectifier has the usual rectifier or backward characteristic. When the frequency of the input voltage from voltage source 14 applied to the electrodes of magneto-electric rectifier elements 11 and 12 exceeds a certain threshold frequency, the characteristic of that magneto-electric rectifier element is linear, as indicated by curve 28; this characteristic is that of a forward rectifier or a conventional resistor.

Referring again to FIGURE 1, during one half cycle of the alternating current input voltage, electrode 21 of magneto-electric rectifier 11 will be positive relative to the opposite electrode 22, while electrode 23 of magneto-electric rectifier 12 will be negative with respect to electrode 24. Considering the magneto-electric rectifier 11 alone, for a magnetic field H directed as shown in FIGURE 1, and for a surface orientation as shown in FIGURE 1, carriers normally would be directed toward the smooth or low recombination velocity surface 16 and a current flow would take place from the instantaneously positive electrode 21 to the instantaneously negative electrode 23 of magneto-electric rectifier 11. In magneto-electric rectifier 11, the magnetic field passes from left to right through the element, looking from the positive electrode 21 to the negative electrode 22. In contrast, the magnetic field H of magneto-electric rectifier 12 passes from right to left looking from positive electrode 23 to negative electrode 24 of magneto-electric rectifier 12. Carriers in magneto-electric rectifier 12 thus would be deflected to the high recombination velocity surface 19, instead of toward the low recombination velocity surface, as in the case of magneto-electric rectifier 11. Most of the carriers formed in magneto-electric rectifier 11 reach the negative electrode 22 and magneto-electric rectifier is equivalent to a forwardly biased diode. In other words, magneto-electric rectifier 11 is ohmic and behaves as an ordinary resistor. Most of the carriers in magneto-electric rectifier 12, however, are recombined at high recombination velocity surface 19 of magnetic-electric rectifier 12, so substantially none can reach the negative electrode 24. The magneto-electric rectifier 12, consequently, is equivalent to a reversely biased diode and current flow through this magneto-electric rectifier is blocked. Since both magneto-electric rectifiers 11 and 12 are in series, no current can flow through the load 15 during this half cycle of alternating current input voltage.

During the next half cycle of the alternating current input voltage, electrodes 21 and 22 of magneto-electric rectifier 11 are instantaneously negative and positive, respectively, whereas electrodes 23 and 24 of magneto-electric rectifier 12 are instantaneously positive and negative respectively. Now the carriers are directed toward the low recombination velocity surface 18 of magneto-electric rectifier 12 and the latter exhibits ohmic characteristics. The carriers in magneto-electric rectifier 11, however, are directed toward the high recombination velocity surface 17 and magneto-electric rectifier 11 now acts as a reversely biased diode to block current load through the load 15 during this half cycle. Summarizing, at lower frequencies of input voltage, that is, at frequencies below the threshold frequency of the individual magneto-electric rectifiers 11 and 12, each magneto-electric rectifier acts during alternating half cycles of alternating current input voltage to block current flow through the series circuit including the load 15; consequently, the output load voltage or current is a null.

It should be noted that, if the direction of the magnetic field supplied to both of the magneto-electric rectifiers is reversed, whether or not the magnetic field is common to both magneto-electric rectifiers or individual fields for each magneto-electric rectifier, the operation of the filter circuit basically is unchanged, the only effect being to reverse the particular magneto-electric rectifier which blocks current flow at any given half cycle of input voltage. If separate magnetic fields are supplied to both magneto-electric rectifiers and one only of these fields is reversed, then it becomes necessary to reverse the low and high recombination velocity surfaces of the magneto-electric rectifier associated with the magnetic field so reversed.

At higher frequencies (frequencies above the threshold frequency), the recombination of carriers cannot be achieved at the high recombination velocity surface of either magneto-electric rectifier during a half cycle of alternating current input voltage. Consequently, at these higher frequencies, magneto-electric rectifiers 11 and 12 both display ohmic characteristics and current flows through both magneto-electric rectifiers 11 and 12 and load 15 during both halves of the alternating current input voltage cycle. In this manner, the circuit of FIGURE 1 acts as a high pass filter, with a cut off frequency determined by the threshold frequency of the two magneto-electric rectifiers 11 and 12. As previously mentioned, the threshold frequency, for a given rectifier material, is governed principally by the thickness of the magneto-electric rectifier elements.

In FIGURE 3, a low pass filter circuit is shown wherein compounds corresponding to those shown in FIGURE 1 are indicated by like reference characters. The low pass filter circuit of FIGURE 3 is in the form of a Wheatstone bridge 30 having the usual four arms and junction points 31, 32, 33 and 34. A source 14 of alternating current input voltage is connected to junction points 31 and 33 of bridge 30. The bridge includes two parallel branches connected across the input voltage. The first of these branches includes magneto-electric rectifiers 11 and 12 connected in series and in opposite rectification direction. Each of these magneto-electric rectifiers are connected in first and second arms of bridge 30. A second branch of the bridge includes resistors 36 and 37 connected in series, one of said resistors being connected in the third bridge arm and the other in the fourth bridge arm. As shown in FIGURE 3, one of these resistors, namely resistor 37, is indicated as variable and can be adjusted to assist in initially balancing the bridge for any given set of bridge components. In addition to the input voltage source 14 connected in one diagonal 31, 33 of bridge 30, a load 15 is connected in the other diagonal 32, 34 of the bridge. The manner of operation of each of the magneto-electric rectifiers 11 and 12, when subjected to a constant field H and a voltage across the end faces, is identical to the operation described in connection with FIGURES 1 and 2. The two magneto-electric rectifiers 11 and 12 of the bridge circuit 30, 33, like those in the circuit of FIGURE 1, are connected in series and in opposite rectification direction. As in the circuit of FIGURE 1, if separate magnetic fields are associated with each of the magneto-electric rectifiers of FIGURE 3 and one of these fields is reversed, the magneto-electric rectifier associated therewith must be reoriented so as to reverse the position of the low and high combination velocity surface of that magneto-electric rectifier.

Each of the magneto-electric rectifiers 11 and 12 of FIGURE 3 includes ohmic contacts or electrodes at the end faces for connecting respective magneto-electric rectifiers into the arms of the bridge. The major surfaces 16 and 17 of magneto-electric rectifier 11 are low and high recombination velocity surfaces, respectively, while major surfaces 18 and 19 of magneto-electric rectifier 12 are low and high recombination velocity surfaces, respectively. The magnetic field H, directed perpendicular to the current path of the magneto-electric rectifiers and parallel to the major faces, may be common to both magneto-electric rectifiers or may be separate fields for each magnetic-electric rectifier. It should be pointed out that FIGURE 3 essentially is a schematic diagram and that the two magneto-electric rectifiers 11 and 12, in practice, may be disposed more or less back to back; in this case, a single magnetic field for both devices, such as indicated by the arrow in FIGURE 1 would be more practical than the two separate fields indicated by the arrows in FIGURE 3.

If it be assumed that the alternating current input voltage is such that points 31 and 33 are instantaneously positive and negative, respectively, relative to one another, and that the frequency is below the threshold frequency for the magneto-electric rectifiers 11 and 12, carriers will be diverted toward the low recombination velocity surface 16 of magneto-electric rectifier 11, and the latter is forwardly biased, or ohmic. At the same time, magneto-electric rectifier 12 is in the blocking condition and there will be no appreciable voltage drop across magneto-electric rectifier 12. The potential at point 32, therefore, will be substantially that at point 33 of the bridge. The voltage drops across both resistors 36 and 37, however, are substantially equal, whereupon the potential at point 34 is approximately midway between the potentials at points 31 and 33. Point 32, then, is instantaneously more negative than point 34; consequently, there exists a potential difference between points 32 and 34 of the bridge network and current will flow in load 15 connected in the diagonal of the bridge between points 33 and 34. The complete path for current flow during this half cycle of alternating current input voltage is from the instantaneously positive terminal of the source 14, through ohmic magneto-electric rectifier 11, load 15, variable resistor 37, and point 33, in the order named, and back to the instantaneously negative terminal of source 14.

During the next half cycle, points 31 and 33 are instantaneously negative and positive, respectively; it is now evident that magneto-electric rectifier 11 is blocking, since carriers will be diverted to the high recombination velocity surface 17. The magneto-electric rectifier 12, however, acts as a resistor, since the carriers therein are diverted to the low recombination velocity surface 18. Point 32 of the bridge now assumes a negative potential substantially equal to that at point 31, while the potential at point 34 is about midway between the potentials at points 31 and 33. Consequently, point 32 is positive relative to point 34 and current flows through load 15. This current starts at the instantaneously positive terminal of source 14, continues to point 33, through magneto-electric rectifier 12 to point 32, thence through load 15 and fixed resistor 36 to point 31, and then back to the instantaneously negative terminal of source 14. For input voltages of frequency below the threshold frequency of magneto-electric rectifiers 11 and 12, therefore, an alternating load current and voltage is available at all times.

If the frequency of the alternating current input voltage from source 14 exceeds the threshold frequency of magneto-electric rectifiers 11 and 12, however, recombination at the high recombination velocity surfaces 17 and 19 of respective magneto-electric rectifiers 11 and 12 cannot occur during the period of a half cycle of input voltage. Therefore, both magneto-electric rectifiers are always ohmic for the higher frequencies. The bridge 30 now consists of four equal resistors and points 32 and 34 of the bridge are at substantially the same potential. In this balanced condition of bridge 30, no current can flow through the load 15 connected in the bridge diagonal 32, 34. The strength of the magnetic field applied to the magneto-electric rectifiers of FIGURE 3 is chosen so that the normal ohmic resistance of these elements, when operating in the forward direction of ordinary resistors, is equal to the resistance of resistors 36 and 37. Resistor 37 is made variable to take care of the minor differences in resistance of the various elements inserted in the bridge circuit arms.

From the above description, it is evident that the circuit of FIGURE 3 is a low pass filter having a cut off frequency corresponding to the threshold frequency of the individual magneto-electric rectifiers 11 and 12. As in the case of the high pass filter circuit of FIGURE 1, the threshold frequency is determined largely by the thickness of the individual magneto-electric rectifiers 11 and 12.

What is claimed is:

1. A filter for effecting transmission of input alternating current electrical energy to a load at frequencies on one side only of a predetermined threshold frequency comprising a pair of magneto-electric rectifying elements connected in circuit with said load, said elements further having opposed major surfaces between which exists a current path, a first of said major surfaces having a high surface recombination velocity, and a second of said major surfaces having a low surface recombination velocity, and means for applying a magnetic field to each of said elements oriented normal to said current path and parallel to said major surfaces, said elements being ohmic at frequencies above said threshold frequency and rectifying at frequencies below said threshold frequency, each of said elements blocking current flow therethrough during a corresponding half of each alternating current cycle.

2. A filter according to claim 1, wherein said threshold frequency is a function of the spacing between said opposed major surfaces.

3. A high pass filter for blocking transmission of input electrical energy to a load at frequencies below a predetermined threshold frequency comprising a pair of magneto-electric rectifying elements connected in opposed rectification direction in series with a load and an input voltage source, said elements each including an elongated semiconductor having electrodes at opposite end faces partially defining an electrical current path through said element, said elements further having opposed major surfaces, a first of said surfaces having a high surface recombination velocity and a second of said major surfaces having a low surface recombination velocity and means for applying a magnetic field to each of said elements oriented normal to said current path and parallel to said major surfaces, said elements being ohmic at frequencies above a said threshold frequency and rectifying at frequencies below said threshold frequency.

4. A high pass filter according to claim 3 wherein said threshold frequency is a function of the spacing between said opposed major surfaces.

5. A low pass filter for blocking transmission of input electrical energy to a load at frequencies above a predetermined threshold frequency comprising an electrical bridge network including first and second parallel branches, said first branch comprising two serially connected arms each containing a magneto-electric rectifier, said rectifiers being connected in opposite rectification direction, said second branch comprising two additional serially connected arms each containing a resistor, means for supplying input electrical energy to said bridge network, and a load connected in a diagonal of said bridge network, said magneto-electric rectifiers each including a semiconductor element having electrodes partially defining an electric current path through said element, said elements further having opposed major surfaces, a first of said surfaces having a high surface recombination velocity and a second of said major surfaces having a low surface recombination velocity, means for applying a magnetic field to each of said rectifiers oriented normal to said current path and parallel to said major surfaces, said rectifiers being ohmic at frequencies above said threshold frequency and rectifying at frequencies below said threshold frequency, said bridge being balanced during ohmic operation of said rectifiers for blocking current flow through said load, said bridge further being unbalanced during rectifying operation of said rectifiers for permitting current flow through said load.

6. A low pass filter according to claim 5 wherein each of said elements is a substantially rectangular elongated thin slab having said electrodes at opposite end faces, said threshold frequency being a function of the thickness of said slab.

7. A low pass filter for blocking transmission of input electrical energy to a load at frequencies above a predetermined threshold frequency comprising an electrical bridge network including two interconnected branches each containing a magneto-electric rectifier element and a resistor, means for supplying input electrical energy to said bridge network, and a load circuit connected in a diagonal of said bridge network common to said two branches, said magneto-electric rectifier elements each including an elongated semiconductor element having electrodes at opposite end faces partially defining an electric current path through said element, said elements having further opposed major surfaces, a first of said surfaces having high surface recombination and a second of said major surfaces having low surface recombination, means for applying a magnetic field to each of said elements oriented normal to said current path and parallel to said major surfaces, said elements being ohmic at frequencies above said threshold frequency and rectifying at frequencise below said threshold frequency, said bridge being balanced during ohmic operation of said elements and said bridge being unbalanced during rectifying operation of said elements for producing current flow through said load circuit.

References Cited

UNITED STATES PATENTS

| | | | |
|---|---|---|---|
| 2,553,490 | 5/1951 | Wallace | 332—44 |
| 3,050,698 | 8/1962 | Brass | 332—51 |
| 3,148,344 | 9/1964 | Kaufmann. | |
| 3,118,114 | 1/1964 | Barditch | 330—38 |
| 3,173,102 | 3/1965 | Loewenstern | 330—39 |
| 3,185,937 | 5/1965 | Chang | 330—63 |

ELI LIEBERMAN, *Primary Examiner.*

C. BAROFF, *Assistant Examiner.*

U.S. Cl. X.R.

333—70; 332—51; 317—235